Dec. 8, 1953  F. O. DOLEZAL  2,661,859
HEAT RESISTANT RADIATOR CAP COVER ATTACHMENT
Filed Dec. 28, 1951

INVENTOR
FRANK O. DOLEZAL,

BY
McMorrow, Berman & Davidson
ATTORNEYS

UNITED STATES PATENT OFFICE 2,661,859

HEAT RESISTANT RADIATOR CAP COVER ATTACHMENT

Frank O. Dolezal, San Francisco, Calif.

Application December 28, 1951, Serial No. 263,878

1 Claim. (Cl. 220—24)

This invention relates to automobile radiator caps, and more particularly to a heat resisting attachment to be employed on an automobile radiator cap.

A main object of the invention is to provide a novel and improved protective cover for an automobile radiator cap which is simple in construction, which is easy to install, and which allows the radiator cap to be removed without injury to the hand of the person removing the cap, even when the engine of the automobile is in a hot condition.

A further object of the invention is to provide an improved heat resisting attachment for a conventional radiator cap, said attachment being inexpensive to manufacture, being sturdy in construction, and being easy to mount on a radiator cap, whereby a heat insulating shield is provided on the radiator cap enabling the cap to be removed without danger of burning the hand of the person removing the cap.

Further objects and advantages of the invention will become apparent from the following description and claim, and from the accompanying drawings, wherein:

Figure 1:
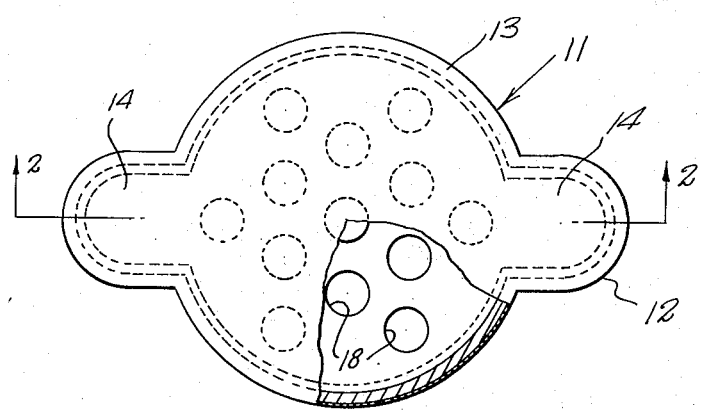
Figure 1 is a top plan view, partly in horizontal cross section, of an improved protective cover for an automobile radiator cap constructed in accordance with the present invention.
Figure 2:
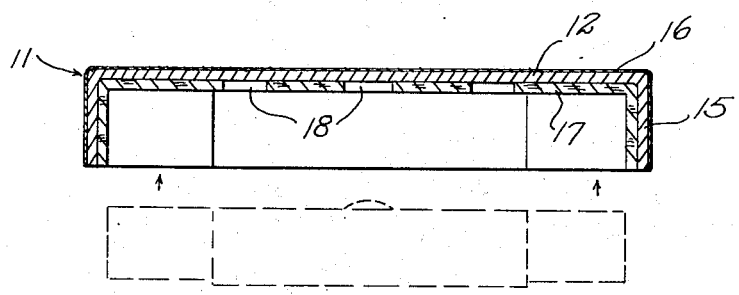
Figure 2 is a vertical cross sectional view taken on the line 2—2 of Figure 1.

Referring to the drawings, the protective cover is designated generally at 11 and comprises a main body 12 of rigid sheet material, preferably heat insulating material, such as compressed asbestos composition or other rigid fibre composition, said body being formed with the relatively large, substantially circular intermediate portion 13 and the diametrically opposed lug portions 14, 14. The body 12 is formed with the peripheral flange 15 which depends from the margin thereof and extends completely around the body.

The top surface and side surfaces of the body 12 are provided with a luminous coating 16 of fluorescent paint or similar luminous material, enabling the cover to be readily seen in the dark. Alternatively, the top and side exterior surfaces of the cover may be coated with white paint to improve its visibility.

Secured inside the body 12 is a lining 17 of relatively tough resilient deformable material, such as cork or the like, said lining being formed with the perforations 18 distributed uniformly beneath the circular main body portion 13 of the cover.

Figure 3:
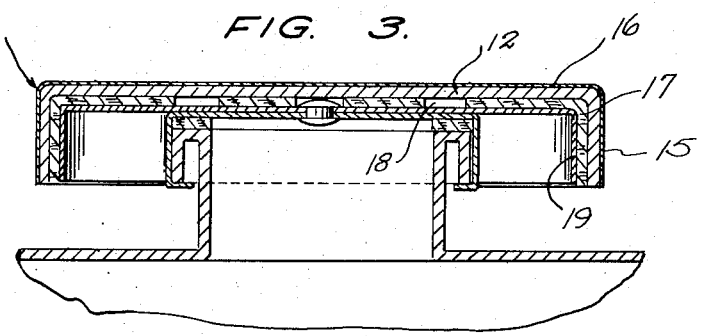
Figure 3 is a vertical cross sectional view taken through an automobile radiator cap provided with an improved protective cover such as is shown in Figures 1 and 2.

The cover 11 is dimensioned so that it fits tightly over a conventional radiator cap, such as the radiator cap shown at 19 in Figure 3 and makes a tight fit thereon, the resilient lining 17 yielding sufficiently to allow the cover to be forced onto the radiator cap 19 and providing a tight frictional fit on the radiator cap 19. As shown in Figure 3, the depending peripheral flange 15 of the protective cover substantially completely covers the depending peripheral flange of the radiator cap, providing complete protection against contact with the surface of the radiator cap. After the protective cover 11 has been forced onto the radiator cap, as above described, it remains permanently secured thereto. The radiator cap may therefore be handled without risk of burning the hand of the person wishing to remove the radiator cap from the radiator.

If so desired, the attachment may be secured to the radiator cap by the use of any suitable adhesive material, such as glue or the like, instead of relying exclusively on the frictional engagement of the resilient lining 17 with the surface of the radiator cap.

While a specific embodiment of an improved protective cover for an automobile radiator cap has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A protective cover for an automobile radiator cap comprising a heat-insulating main body of compressed sheet asbestos composition having a substantially circular intermediate portion, diametrically opposed lug portions, and a peripheral depending flange, said main body being shaped to fit over an automobile radiator cap, a coating of luminous material on the exterior of said body, and an inner, deformable heat-insulating lining of resilient sheet cork formed with a plurality of apertures, said inner lining being secured inside said main body and being arranged to frictionally engage the radiator cap to secure the cover thereon.

FRANK O. DOLEZAL.

References Cited in the file of this patent

UNITED STATES PATENTS

| Number | Name | Date |
|---|---|---|
| 326,189 | Williams | Sept. 15, 1885 |
| 666,651 | Decherd | Jan. 29, 1901 |
| 701,305 | Daughtry | June 3, 1902 |
| 1,263,508 | Zeckser | Apr. 23, 1918 |
| 1,360,388 | Gaynor | Nov. 30, 1920 |
| 1,745,624 | Kiefer | Feb. 4, 1930 |
| 2,566,490 | Heinz | Sept. 4, 1951 |

FOREIGN PATENTS

| Number | Country | Date |
|---|---|---|
| 675,078 | France | Oct. 29, 1929 |